United States Patent [19]

Nakamura et al.

[11] Patent Number: 5,587,764
[45] Date of Patent: Dec. 24, 1996

[54] CAMERA-SHAKE CORRECTING CAMERA

[75] Inventors: Toshiyuki Nakamura, Tokyo; Yoshikazu Iida, Chigasaki, both of Japan

[73] Assignee: Nikon Corporation, Tokyo, Japan

[21] Appl. No.: 561,157

[22] Filed: Nov. 21, 1995

Related U.S. Application Data

[63] Continuation of Ser. No. 135,615, Oct. 14, 1993, abandoned.

[30] Foreign Application Priority Data

Oct. 30, 1992 [JP] Japan ................... 4-292335

[51] Int. Cl.⁶ ................ G03B 3/00; G03B 17/00
[52] U.S. Cl. .......................................... 396/55
[58] Field of Search ................ 354/400, 195.1, 354/410, 430

[56] References Cited

U.S. PATENT DOCUMENTS

| | | | |
|---|---|---|---|
| 5,220,375 | 6/1993 | Ishide et al. | 354/430 |
| 5,231,445 | 7/1993 | Onuki et al. | 354/410 |
| 5,266,981 | 11/1993 | Hamade et al. | 354/400 |
| 5,335,032 | 8/1994 | Onuki et al. | 354/400 |
| 5,337,098 | 8/1994 | Imafuji et al. | 354/430 |

*Primary Examiner*—Russell E. Adams
*Attorney, Agent, or Firm*—Staas & Halsey

[57] ABSTRACT

A camera-shake correcting camera, which corrects a camera shake by moving a camera-shake correcting device forming a part of phototaking optical system, comprises a first control device for controlling movement of the camera-shake correcting device, a second control device for executing a sequence control of the camera-shake correcting camera, a first data transfer device for transferring data in serial transfer between the first control device and the second control device, and a second data transfer device for executing transmission or reception of a binary signal between the first control device and the second control device, wherein the data transfer is carried out through the second data transfer device while the first control device is controlling the camera-shake correcting device.

3 Claims, 6 Drawing Sheets

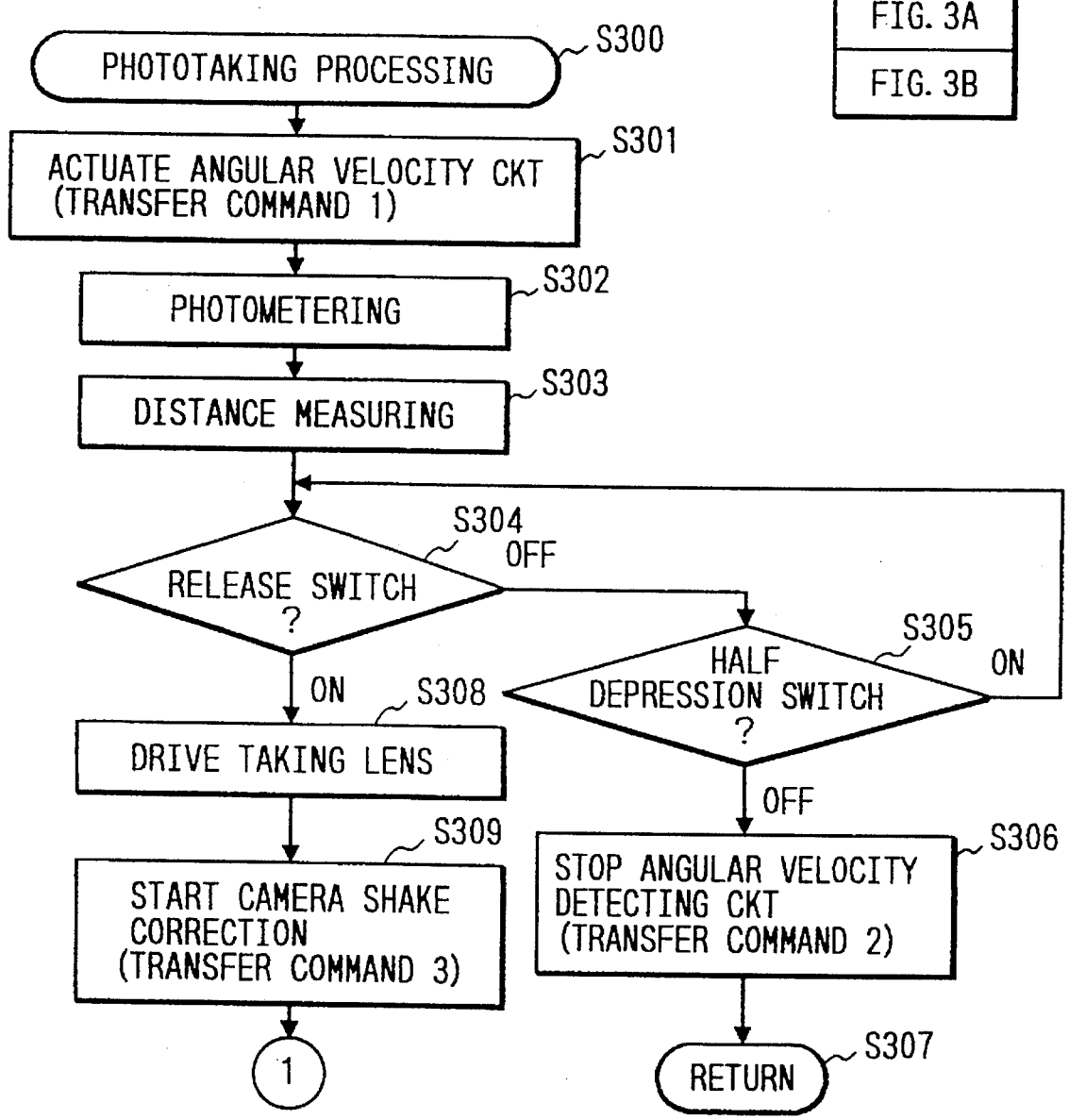

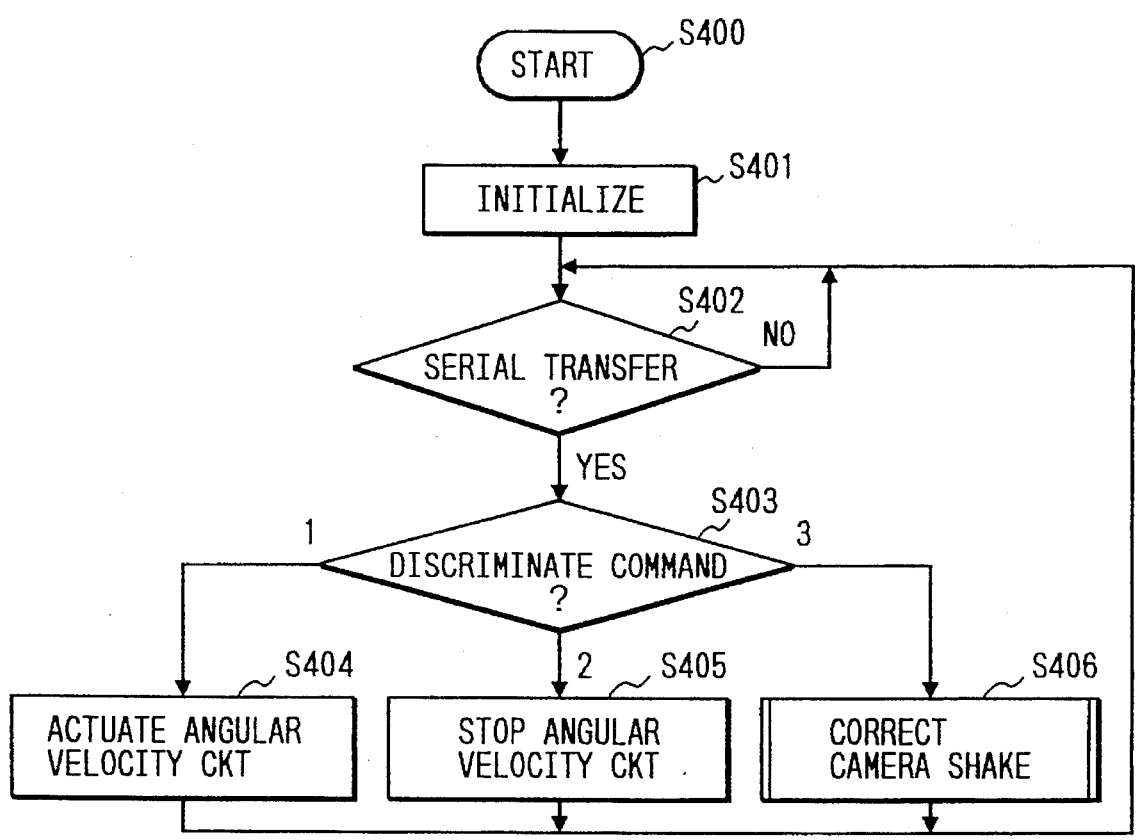

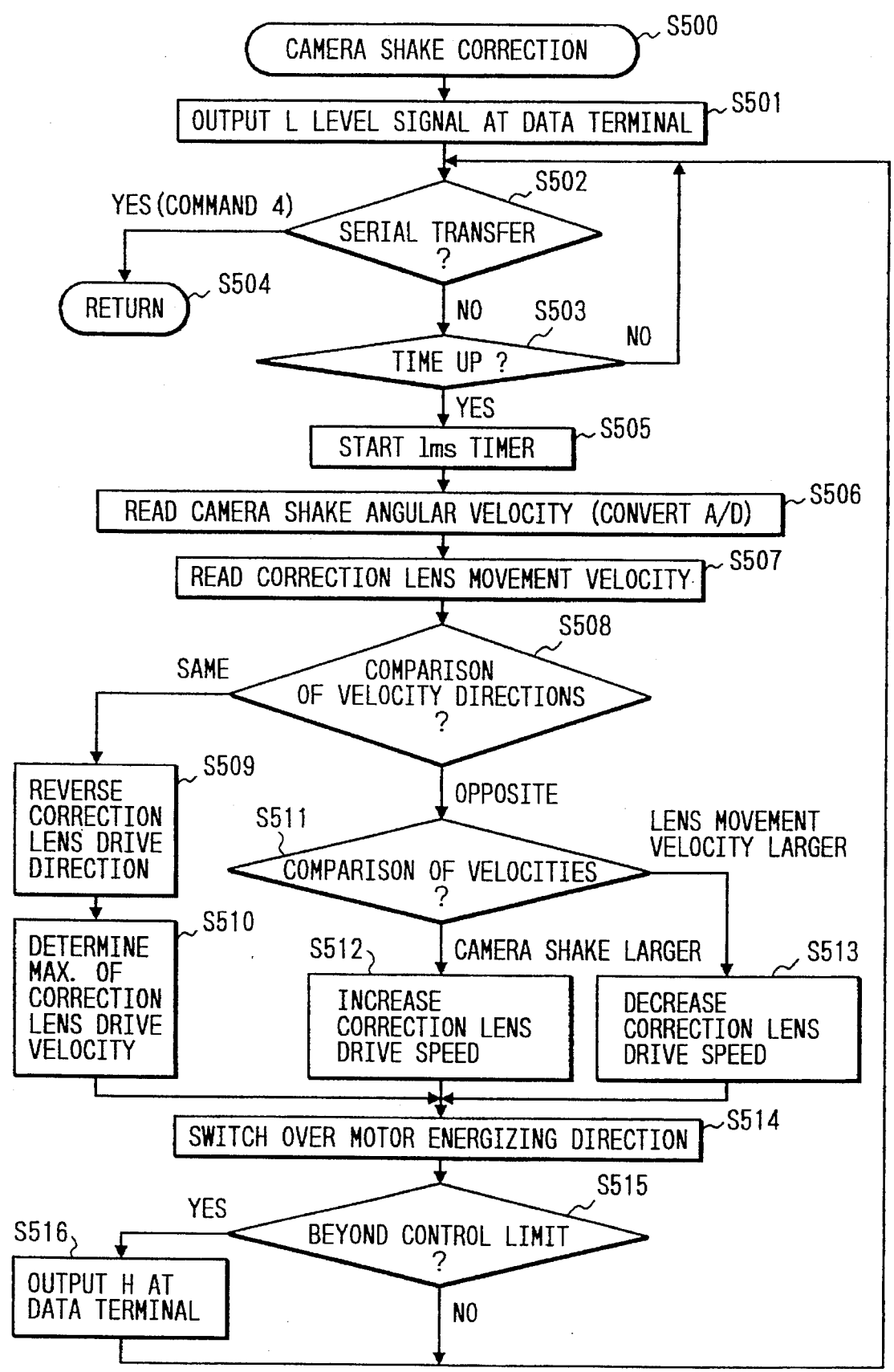

CAMERA-SHAKE CORRECTING CAMERA

This application is a continuation, of application Ser. No. 08/135,615, filed Oct. 14, 1993, now abandoned.

BACKGROUND OF THE INVENTION

1. Field of the Invention

The present invention relates to a camera-shake correcting camera, which is arranged to correct camera shakes in taking photos.

2. Related Background Art

In case that a camera is controlled by a plurality of micro computers built therein, there occurs necessity of information transfer between the micro computers. The clocked serial transfer method is conventionally frequently used as the transfer. Method because the clocked serial transfer method has an advantage that a lot of information can be transmitted through a smaller number of signal lines.

Meanwhile, conventionally known is a camera with a camera-shake correcting function, in which a camera shake amount is detected by a shake amount detecting circuit, or the like, built in the camera and a shake correcting lens is driven based on the detected amount of camera shake to correct the camera shake. Since such a camera with a shake correcting function requires simultaneous control of both shake correction and shutter opening and closing, the control cannot be performed by a single micro computer, and is normally performed by a plurality of micro computers.

In case that two micro computers are used for shake correction control and for shutter opening and closing control, it is general to use one micro computer for general sequence control and the other for shake correction control. Since the shake correction control is executed in parallel with the shutter opening and closing control, the shake correcting micro computer normally controls the shake correcting lens while the sequence control micro computer is under operation of shutter opening and closing control.

The shake correction is processed at high speed. Nevertheless, when the shake correcting camera in the conventional structure as described above needs data transfer to the sequence control micro computer during execution of shake correction process, the shake correction process is interrupted during execution of transfer process in the serial transfer method, causing a problem of lowered performance of shake correction.

SUMMARY OF THE INVENTION

The present invention has been accomplished taking the above problem into account. It is an object of the present invention to provide a system which can maintain the performance of shake correction process even if data transfer is carried out between micro computers during execution of shake correction process.

To achieve the above object, a camera-shake correcting camera according to the present invention, in which a camera shake is corrected by moving a camera-shake correcting system forming a part of a phototaking optical system, comprises a first controller (micro computer 1 for camera shake correction control) for controlling movement of the camera-shake correcting system, a second controller (micro computer 2 for sequence control) for executing a sequence control in the camera-shake correcting camera, a first data transfer means (SIN line, SOUT line, SCLK line) for transferring data in serial transfer between the first controller and the second controller, and a second data transfer device (DATA line) for transferring a binary signal between the first controller and the second controller, wherein data transfer is done through the second data transfer device while the first controller is controlling the camera-shake correcting system.

The camera-shake correcting camera so arranged is provided with the data transfer device for exclusive use for transmitting or receiving a binary signal, so that the dedicated data transfer device may execute reception or transmission of a binary signal during execution of the camera shake correction process, which enables data transfer within a short processing time. Since the dedicated data transfer device transfers data during execution of the camera shake correction process, the data transfer is completed within a short processing time, shortening the time of interruption of camera shake correction process. This enables the data transfer with the performance of camera shake correction process being maintained.

BRIEF DESCRIPTION OF THE DRAWINGS

FIG. 4 is a flowchart to show an embodiment of the camera-shake correcting camera according to the present invention; and FIG. 5 is a flowchart to show an embodiment of the camera-shake correcting camera according to the present invention.

DESCRIPTION OF THE PREFERRED EMBODIMENTS

The embodiments of the present invention will be described in detail with reference to the drawings.

Figure 1:
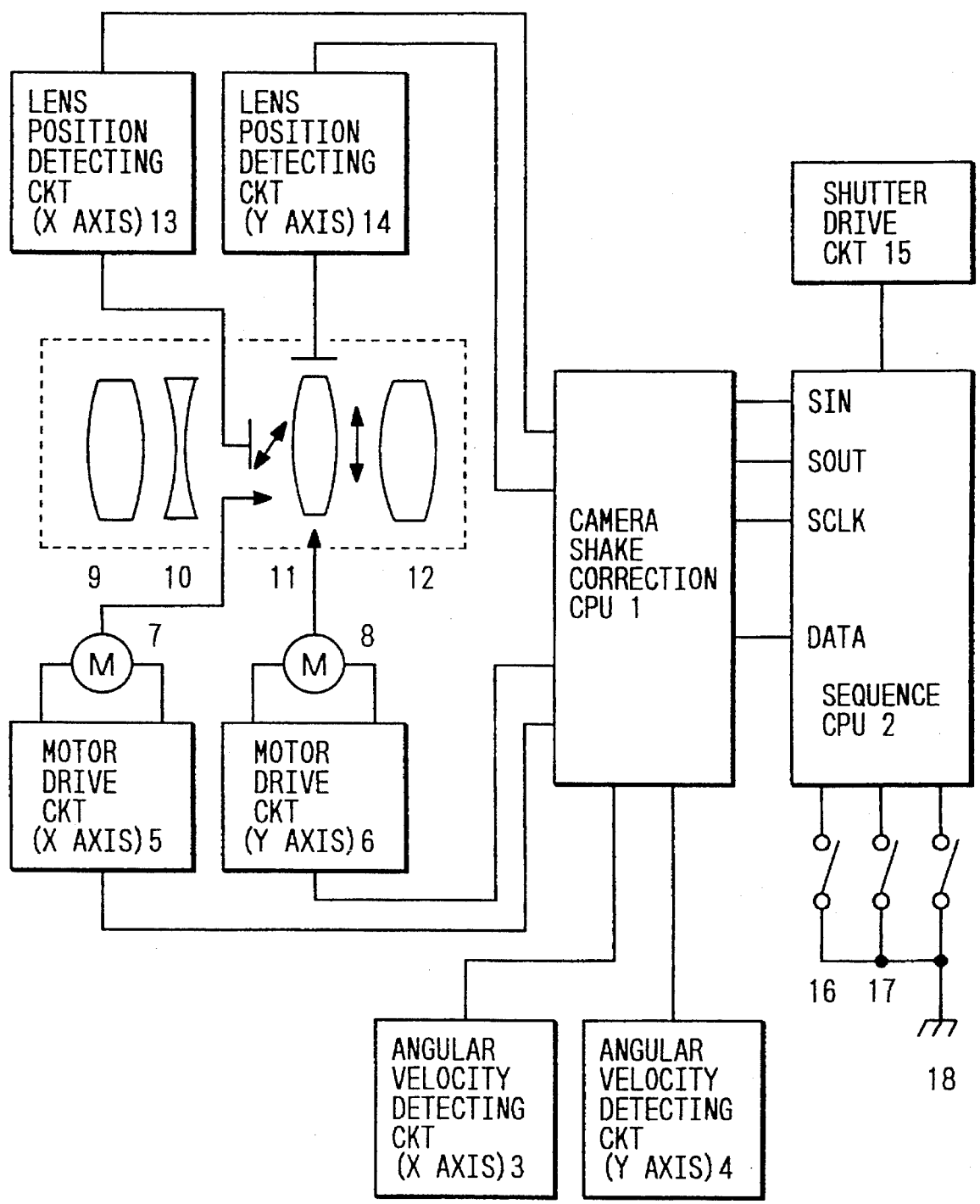
FIG. 1 is a circuit diagram to show an embodiment of the camera-shake correcting camera according to the present invention.

FIG. 1 is a circuit diagram to show an embodiment of the camera-shake correcting camera according to the present invention.

In FIG. 1, a phototaking lens is comprised of four lenses 9, 10, 11 and 12. Among the four lenses the correction lens 11 is a lens for correcting camera shakes, which can be driven in the directions of X axis (in the horizontal direction) and Y axis (in the vertical direction) to correct camera shakes. Connected to a sequence control micro computer 2 are a half depression switch 16 which is turned on by a half depression of a release button, (not shown) a release switch 17 which is turned on by a full depression of the release button, and a shutter drive circuit 15. Further, a camera shake correction control micro computer 1 is also connected to the micro computer 2.

The sequence control micro computer 2 is connected to the camera shake control micro computer 1 through the SIN line, the SOUT line and the SCLK line for clocked serial transfer signals and the DATA line for dedicated signal. Also, the main switch 18 is a state switch having an on position and an off position, which, once a user sets the switch in the on position, holds the on position until the user again resets the switch in the off position.

Connected to the camera shake correction control micro computer 1 are an angular velocity detecting circuit 3 for detecting an angular velocity of camera shake amount in the X axis direction, an angular velocity detecting circuit 4 for detecting an angular velocity in the Y axis direction, motor drive circuits 5 and 6, and lens position detecting circuits 13 and 14. A motor 7 for driving the correction lens 11 in the X axis direction is connected to the motor drive circuit 5. A motor 8 for driving the correction lens 11 in the Y axis direction is connected to the motor drive circuit 6. The lens position detecting circuit 13 detects a position (movement amount) of the correction lens 11 in the X axis direction. The lens position detecting circuit 14 detects a position (movement amount) of the correction lens 11 in the Y axis direction.

The angular velocity detecting circuit 3, 4 changes its output value depending upon an angular velocity caused by a camera shake. The camera shake correction control micro computer 1 converts the output values from analog to digital to detect an angular velocity of camera shake. The angular velocity detecting circuit 3 detects an angular velocity in the X axis direction, while the angular velocity detecting circuit 4 detects an angular velocity in the Y axis direction.

The motor drive circuits 5 and 6 duty-drive the motors 7 and 8, respectively. The camera shake correction control micro computer 1 instructs a drive direction by a drive direction signal and a drive speed by a drive duty signal.

The motor drive circuits 5 and 6 energize the motors 7 and 8, respectively, in the instructed direction and at an arbitrary duty ratio according to the signal to control the correction lens 11 at an arbitrary speed.

Rotation of the motor 7 is converted into a linear motion by a correction lens drive mechanical system (not shown) to drive the correction lens 11 in the X axis direction. Rotation of the motor 8 is converted into a linear motion by a correction lens drive mechanical system (not shown) to drive the correction lens 11 in the Y axis direction. The lens position detecting circuit 13 outputs pulses according to a movement amount of the correction lens 11 in the X axis direction. The lens position detecting circuit 14 outputs pulses according to a movement amount of the correction lens 11 in the Y axis direction. The camera shake correction control micro computer 1 counts the number of pulses thereby to read a position and a movement amount of the correction lens 11 in the X axis direction or in the Y axis direction. Also, the micro computer 1 calculates a moving speed in the X axis direction or in the Y axis direction from a movement amount during a constant time.

The camera shake correction control micro computer 1 is a one-chip micro computer, which controls only the process related to the camera shake correction out of the processes of camera. The micro computer 1 is supposed to include a time counting timer function for counting a time and an A/D conversion function. The sequence control micro computer 2 is a one-chip micro computer, which controls the entire sequence in camera except for the camera shake correction. The micro computer 2 is supposed to have a time counting timer function for counting a time. The processes shown in the flowcharts in FIG. 2 to FIG. 5 show only parts related to the present embodiment in the programs set in the camera shake correction control micro computer 1 and in the sequence control micro computer 2.

The shutter drive circuit 15 opens and closes a shutter (not shown), based on a signal from the sequence control micro computer 2.

The camera in the present embodiment has a function to close the shutter, irrespective of the result of photometry, if the shutter time is slow and if a camera shake amount is out of the control limit of a camera shake correction process, that is, if the camera shake amount is too large to correct a camera shake even with drive of correction lens 11 up to the limit. This can prevent degradation of photographic result due to camera shakes, though exposure is under. This is an example to show the features of the present invention, and it should be noted that the present invention is applicable to other functions than this example. The processes will be described in detail with reference to the flowcharts FIGS. 2–5.

Figure 2:
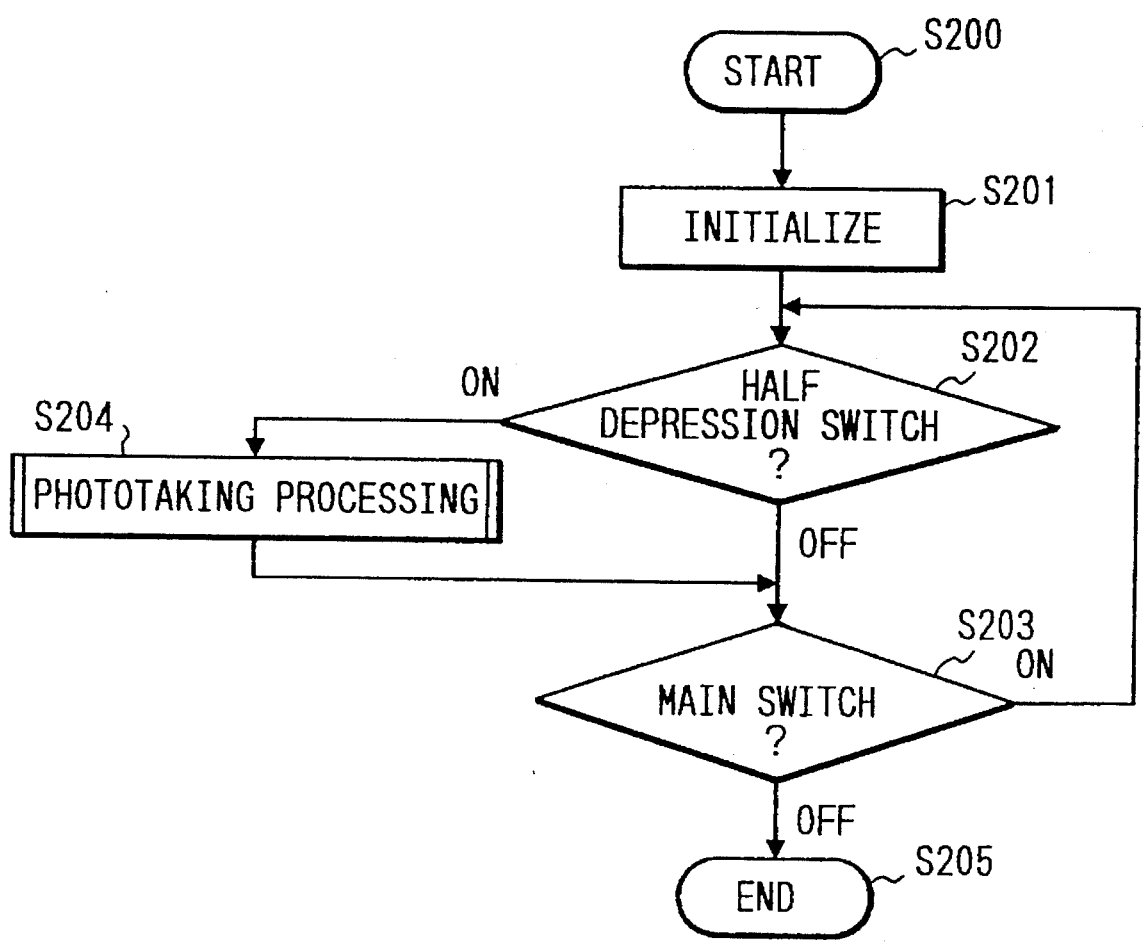
FIG. 2 is a flowchart to show an embodiment of the camera-shake correcting camera according to the present invention.

FIG. 2 is the main flowchart of sequence control micro computer 2 in the embodiment of the present invention. It is assumed that the power is already on, so that the main switch 18 is already turned on, and that processing is started from Step S200.

First, at Step S201, the sequence control micro computer 2 is initialized. The flow then goes into a loop of Step S202 and Step S203 to judge at Step S202 whether the half depression switch 16 is on. If the half depression switch 16 is on at Step S202, then the flow goes to Step S204 to call phototaking processing, as will be described.

If the half depression switch 16 is off at Step S202, it is judged at Step S203 whether the main switch 18 is off. If the main switch 18 is on at Step S203 then the flow returns to Step S202. If the main switch 18 is off at Step S203 then the flow goes to Step S205 to complete the process. After that, the camera is in a wait state until the main switch 18 is again turned on. When the main switch 18 is turned on, the process is again started from Step S200.

Figure 3B:
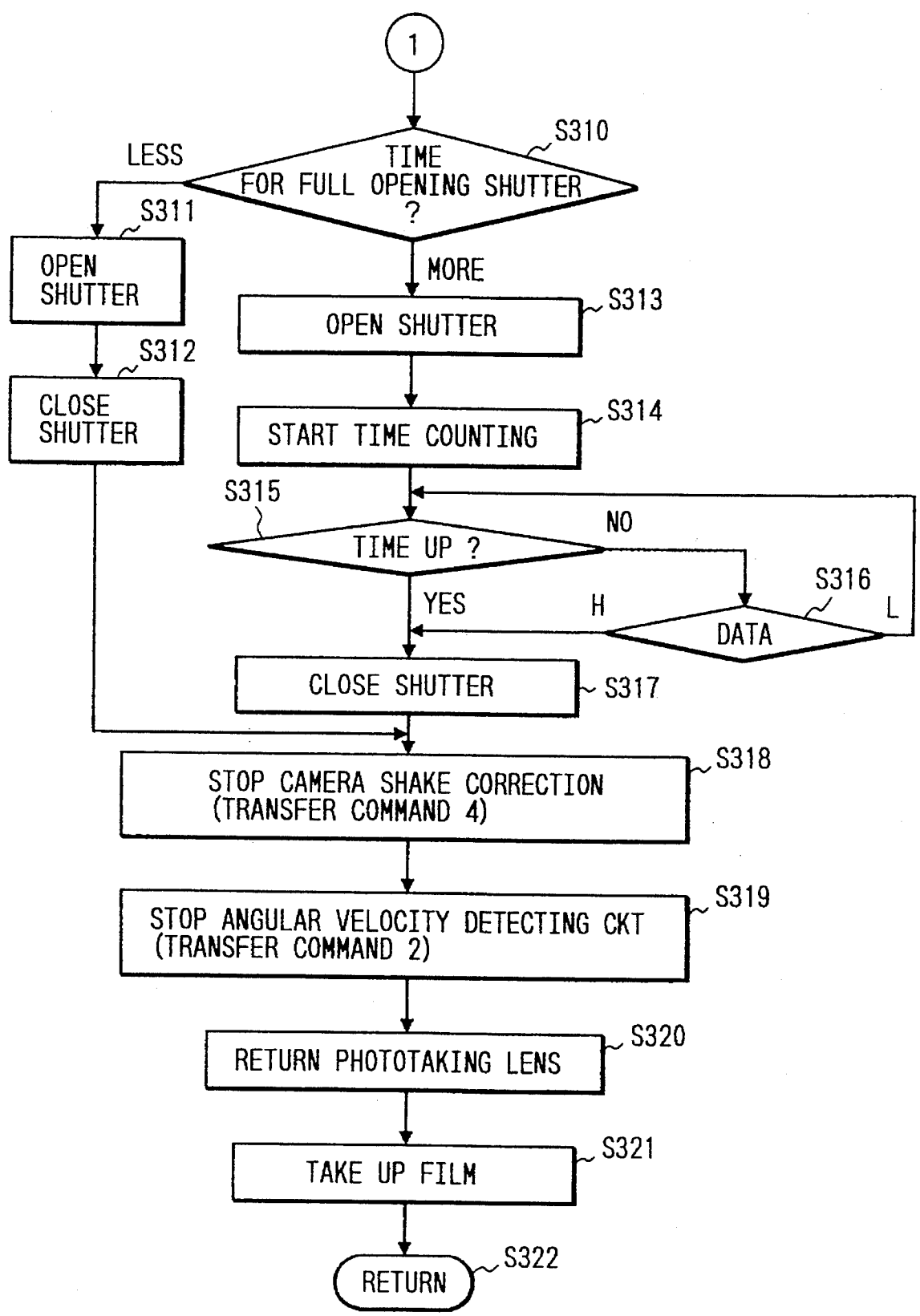
FIG. 3 is comprised of FIG. 3A and FIG. 3B showing flowcharts to illustrate an embodiment of the camera-shake correcting camera according to the present invention.

FIGS. 3A and 3B are flowcharts to show the phototaking processing in the sequence control micro computer 2.

After it is detected that the half depression switch 16 is turned on, the processing is started from Step S300. First, at Step S301, the micro computer 2 sends a command in serial transfer to the camera shake correction control micro computer 1 to actuate the angular velocity detecting circuits 3 and 4. A transferred command number is "1". Then photometering is carried out at Step S302. A shutter opening time is determined from the result of photometering. Distance measurement is next carried out at Step S303. A distance to a subject is calculated from the result of distance measurement and a drive amount of a phototaking lens is determined. After that, the flow goes into a loop of Step S304 and Step S305 to wait either until the release switch 17 is turned on or until the half depression switch 16 is turned off.

If it is detected at Step S305 that the half depression switch 16 is turned off, the micro computer 2 sends a command in serial transfer to the camera shake correction control micro computer 1 to stop the angular velocity detecting circuits 3 and 4 at Step S306. A transferred command number is "2". After that, the flow returns from Step S307 to the flowchart in FIG. 2. In this case, no photo is taken.

If it is detected at Step S304 that the release switch 17 is turned on, then the flow goes to Step S308 to drive the phototaking lens to a certain target position according to the result of distance measurement. Then the micro computer 2 sends a command in serial transfer to the camera shake correction control micro computer 1 to start the camera shake correction process. A transferred command number is "3". The camera shake correction control micro computer 1 executes the camera shake correction process in steps following Step S309 while the sequence control micro computer 2 executes the processing in the flowcharts of FIGS.

3A and 3B. It is then judged at Step S310 whether the shutter opening time obtained in photometering is longer than a time to fully open the shutter. If the shutter opening time is not more than the full opening time (in case of high speed shutter time), the flow goes to Step S311 to carry out a process to open the shutter up to a certain opening amount and then to Step S312 to carry out a process to close the shutter. In this case, the shutter is opened for a determined time according to the result of photometering irrespective of whether the camera shake amount is out of the camera shake correction limit.

If at Step S310 the shutter opening time is over the full opening time (in case of low speed shutter time) then the flow goes to Step S313 to drive the shutter to the full open position. Next, at Step S314, a timer is started to count the time before the shutter opening time elapses. After the timer starts counting the time, the flow is in a loop of Step S315 and Step S316 to wait either until the timer stops counting or until a signal of "H" level, which is the DATA signal, is received from the camera shake correction control micro computer 1. If the camera shake amount exceeds the control limit before the timer finishes counting, the camera shake correction control micro computer 1 changes the DATA signal into "H" level, and then the flow goes to Step S317.

In this case, the shutter is closed because the camera shake amount is out of the control limit. If the camera shake amount is within the control limit, the DATA signal is kept at "L" level, and the flow goes to Step S317 after the timer is finished counting the time. In this case, the shutter is closed after the shutter time according to the result of photometering has elapsed. The shutter closing process is carried out at Step S317, and the micro computer 2 sends a command in serial transfer to the camera shake correction control micro computer 1 at Step S318 to stop the camera shake correction process. A transferred command number is "4".

Next, at Step S319, a command is sent in serial transfer to stop the angular velocity detecting circuits 3 and 4. A transferred command number is "2". Then at Step S320 the phototaking lens is returned to the initial position. At Step S321 film winding is carried out, and thereafter the flow returns from Step S322 to the flowchart in FIG. 2.

FIG. 4 is a flowchart to show the whole processing of camera shake correction control micro computer 1. In FIG. 4, the processing is started from Step S400 with power on, and the micro computer 1 is initialized at Step S401. After that, serial transfer is waited for from the sequence control micro computer 2 at Step S402. Receiving the serial transfer, the command number is checked at Step S403. If the command from the sequence control micro computer 2 is "1" then the angular velocity detecting circuits 3 and 4 are actuated and the flow returns to Step S402 to wait for a next serial transfer. If the command from the sequence control micro computer 2 is "2" then the angular velocity detecting circuits 3 and 4 are stopped and the flow returns to Step S402 to wait for a next serial transfer. If the command from the sequence control micro computer 2 is "3" then the camera shake correction process is called. After the camera shake correction is completed, the flow returns to Step S402 to wait for a next serial transfer.

FIG. 5 is a flowchart to show the camera shake correction process. It is empirically found that the best property for the camera shake correction process is obtained by correcting the camera shake while reading outputs from the angular velocity detecting circuits 3 and 4 at every 1 ms. The same process is effected in the directions of two orthogonal axes.

The camera shake correction process is below described in detail with reference to FIG. 5.

In FIG. 5, serial transfer from the sequence control micro computer 2 starts the processing from Step S500. During execution of camera shake correction, the camera shake correction control micro computer 1 continues reading outputs from the lens position detecting circuits 13 and 14, so that it can always read movement amounts of correction lens 11 in the X axis direction and in the Y axis direction.

First, at Step S501, an "L" level signal is output from the DATA terminal to initialize the DATA terminal. When an "H" level signal is output from the DATA terminal, the camera shake amount is out of the control limit. The flow then enters a loop of Step S502 and Step S503 to wait either until the serial transfer is input or until the timer started at Step S505 finishes counting. As seen from FIGS. 3A and 3B, the sequence control micro computer 2 always transfers a command of camera shake correction stop (command number "4") after the serial transfer of camera shake correction start command (command number "3") is done. Accordingly, if the serial transfer signal is input at Step S502, the next signal is always the command number "4". Thus the flow goes to Step S504 to complete the camera shake correction process and then returns to the flowchart in FIG. 4.

After the time is up in the 1 ms timer at Step S503, the flow goes to Step S505. The 1 ms timer is not started yet immediately after the camera shake correction process is started. In this case, the flow goes to Step S505 when the judgement at Step S503 is first executed. At Step S505 the 1 ms timer is started. Next, at Step S506, outputs from the angular velocity detecting circuits 3 and 4 are read to obtain current camera shake speeds in the X axis direction and in the Y axis direction. Since the data is analogue, it is read through A/D conversion. Then, at Step S507, a current drive speed of the correction lens 11 is obtained both in the X axis direction and in the Y axis direction from output values from the lens position detecting circuits 13 and 14 which are always read. Since the process is executed every 1 ms, the moving speed is obtained as a function of the number of pulses output in 1 ms by the lens position detecting circuit 13 or 14. After the above steps are processed, a current speed of camera shake and a current speed of correction lens 11 are obtained both in the X axis direction and in the Y axis direction. At the following steps the speeds are compared with each other in either axis direction and the camera shake is corrected by changing the drive speed of the correction lens 11.

At Step S508 the direction of velocity is first checked. If the velocity direction of camera shake is the same as the moving direction of the correction lens 11, the correction lens 11 is moving in the direction opposite to the direction to cancel the camera shake. The drive direction of correction lens 11 is reversed at Step S509 to move the correction lens 11 in the direction to cancel the camera shake. Then at Step S510 the drive speed of the correction lens is set at maximum. If the velocity direction of camera shake is opposite to the moving direction of the correction lens 11 at Step S508, the correction lens 11 is moving in the direction to cancel the camera shake, and therefore nothing is done to keep the movement in the current drive direction. Then the flow goes to Step S511 to compare the velocity of camera shake with the velocity of correction lens 11. If the velocity of camera shake is larger than the velocity of the correction lens, 11 the drive amount of correction lens 11 is insufficient. Then the drive velocity of correction lens 11 is increased at Step S512. The drive velocity is determined based on a difference between the camera shake velocity and the velocity of correction lens 11. A drive duty ratio of motor is determined from the velocity difference, and the drive duty ratio is changed to adjust the velocity depending upon the velocity difference. If the camera shake velocity is smaller than the drive velocity of correction lens 11 at Step S511, the drive amount of correction lens 11 is too large. Then the drive velocity of correction lens 11 is decreased at Step S513. The drive velocity is determined from the difference between the camera shake velocity and the velocity of correction lens 11 similarly as at Step S512. A drive duty ratio of motor is determined from the velocity difference, and the drive duty difference is changed to adjust the velocity depending upon the velocity difference. The process at the above steps determines the drive direction and the drive speed of correction lens 11 to correct a current amount of camera shake. The process at these steps is carried out both for X axis and for Y axis. Next, at Step S514, the drive direction signal and the drive duty signal are changed according to the obtained results to actually change the energizing direction and the energizing duty of motor. This process is also carried out both for X axis and for Y axis.

It is then judged at Step S515 whether the camera shake velocity is larger than a predetermined control limit value. If either one of X-axial velocity and Y-axial velocity is larger than the control limit value, an "H" level signal is output through the DATA terminal at Step S516 to request the sequence control micro computer 2 to close the shutter. After that, the flow returns to the loop of Step S502 and Step S503 to repeat the above process.

The processing in FIG. 5 must be carried out once in 1 ms. Let us consider a processing time for carrying out a single processing. Since the processing is one completed inside the micro computer 1, the overall processing time is determined only by the processing speed of camera shake correction micro computer 1. The following discussion is based on the processing speed of general CPU.

A single step requiring the longest processing time is the A/D conversion process at Step S506. Generally, the conversion process needs about 50 μs. The other processes are individual processing steps. Each process is completed in several microseconds for an instruction unit. Steps of from Step S505 to Step S515 normally need about 400 μs. A process at a step on the flowchart is comprised of 10 to several 10 instructions. Since the processing is necessary both for the X axis and for the Y axis, the processing time is about 800 μs in total.

The processing time for executing the serial transfer is generally about 200 μs at highest. Thus, if the serial transfer is executed during the camera shake correction of every 1 ms as in the conventional apparatus, a time of over 1 ms elapses, which results in failure of correct camera shake correction. In contrast, the data transfer at Step S516 in the present embodiment is just inversion of output level at a terminal of the camera shake correction control micro computer 1, which can be processed by a single instruction (in several microseconds). Accordingly, the camera shake correction is not affected by the data transfer to the sequence control micro computer 2. By this arrangement, the camera shake correction continues properly being executed regardless of presence or absence of data transfer.

The present embodiment was described above with an example of data transfer for shutter closing process when the camera shake amount exceeds the control limit at a slow shutter time. The present invention is not limited to this example, but may be applied to another data transfer during execution of camera shake correction. For example, if a warning indication element (LED or LCD) is connected to the sequence control micro computer 2 to indicate a warning when the camera shake amount exceeds a certain warning level, the camera shake correction control micro computer 1 has to transfer a warning indication signal to the sequence control micro computer 2 during execution of camera shake correction. If the present invention is applied to this case, the data transfer can be carried out without influencing the camera shake correction.

Although the above embodiment was described as the example in which a signal is transferred from the camera shake correction control micro computer 1 to the sequence control micro computer 2, the present invention can also be applied to an example in which a signal is reversely transferred from the sequence control micro computer 2 to the camera shake correction control micro computer 1. An example of signal transfer from the sequence control micro computer 2 to the camera shake correction control micro computer 1 is an interrupt instruction during camera shake correction.

Also, the above embodiment was described as the example in which the camera shake correction is effected by moving the correction lens, but the present invention can be applied not only to the example in which the correction lens is moved but also to an example in which the camera shake correction is effected by moving a correction prism.

Further, the above embodiment was described as the example with a single DATA line for transferring a signal of "H" level or "L" level, but a plurality of lines, that is, parallel lines may be employed as well as the single line.

As described above, the camera-shake correcting camera according to the present invention is so arranged that the data transfer means only for transferring or receiving a binary signal is provided and a binary signal is transferred using the dedicated data transfer means during execution of camera shake correction, enabling data transfer in short time. This enables the performance of camera shake correction to be maintained even if the data transfer is executed between the micro computers during execution of camera shake correction.

What is claimed is:

1. A camera-shake correcting camera which corrects a camera shake by moving a camera-shake correcting system forming a part of a phototaking optical system, comprising:

a first controller to control movement of said camera-shake correcting system;

a second controller to execute a sequence control of said camera-shake correcting camera;

a first data transfer device to transfer data serially between said first controller and said second controller; and a second data transfer device, separate from said first data transfer device, to transfer a binary signal corresponding to a camera operation state between said first controller and said second controller, said second data transfer device performing the data transfer of the binary signal while said first controller is controlling said camera-shake correcting system.

2. A camera-shake correcting camera correcting camera shake by moving a camera-shake correcting system forming a part of a phototaking optical system, comprising:

a shutter drive to drive a shutter;

a camera shake correcting system drive to drive the camera shake correcting system;

a camera shake detector to detect an amount of camera shake;

a first controller to control movement of said camera-shake correcting system;

a second controller to execute sequence control of said camera-shake correcting camera;

a first data transfer device to transfer data serially between said first controller and said second controller; and a second data transfer device to transfer a binary signal corresponding to a camera operation state between said first controller and said second controller while said first controller is controlling said camera-shake correcting system, said first controller sending the binary signal to said second controller via said second data transfer device when a detected amount of camera shake cannot be corrected by driving said camera-shake correcting system to a limit, and said second controller generating an operation signal closing the shutter in response to the binary signal.

3. A camera-shake correcting camera correcting camera shake by moving a camera-shake correcting system forming a part of a phototaking optical system, comprising:

a shutter;

a first controller to control movement of said camera-shake correcting system;

a second controller to execute sequence control of said camera-shake correcting camera;

a first data transfer device to transfer data serially between said first controller and said second controller; and a second data transfer device to transfer a binary signal corresponding to a camera operation state from said first controller to said second controller while said first controller is controlling said camera-shake correcting system when a camera-shake amount exceeds a correctable shake limit, said second controller causing said shutter to close upon receipt of the binary signal.

* * * * *